United States Patent
Silvestrini

[11] 3,729,025
[45] Apr. 24, 1973

[54] SOLENOID VALVE WITH STROKE INSENSITIVE PORT

[75] Inventor: Richard L. Silvestrini, South Bend, Ind.

[73] Assignee: The Bendix Corporation, South Bend, Ind.

[22] Filed: Aug. 31, 1970

[21] Appl. No.: 68,096

[52] U.S. Cl. ............137/625.33, 251/118, 251/141, 137/516.11
[51] Int. Cl. ..........................F16k 31/06, F16k 1/12
[58] Field of Search ................137/625.33; 251/141, 251/129, 333, 334, 118; 137/512.11, 516.11, 516.13

[56] References Cited

UNITED STATES PATENTS

| | | | |
|---|---|---|---|
| 802,037 | 10/1905 | Giller | 137/516.13 |
| 810,216 | 1/1906 | Neeland | 137/516.13 |
| 1,201,827 | 10/1916 | Iverson | 137/516.13 |
| 1,768,840 | 7/1930 | Holdsworth | 137/516.11 |
| 3,286,727 | 11/1966 | Kehler | 137/516.13 |
| 2,321,853 | 6/1943 | Ray | 251/141 |
| 2,548,239 | 4/1951 | Ray | 251/141 |
| 2,261,562 | 11/1941 | Ray | 251/141 X |
| 2,353,848 | 7/1944 | Ray | 251/141 |
| 2,358,828 | 9/1944 | Ray | 251/141 X |
| 2,877,791 | 3/1959 | Rich | 137/625.33 X |

Primary Examiner—Henry T. Klinksiek
Attorney—William N. Antonis and Plante, Hartz, Smith and Thompson

[57] ABSTRACT

A solenoid valve has seat configurations comprising various patterns or arrangements of elongated slots. The maximum and minimum lift or stroke of the valve is related to slot width in a manner which materially reduces the differences in mass air flow resulting from variation in lift due to manufacturing tolerances. A supplemental orifice in series with the valve port may further control or limit air flow and minimize flow variation with varying valve strokes.

6 Claims, 12 Drawing Figures

Patented April 24, 1973
3,729,025
4 Sheets-Sheet 1
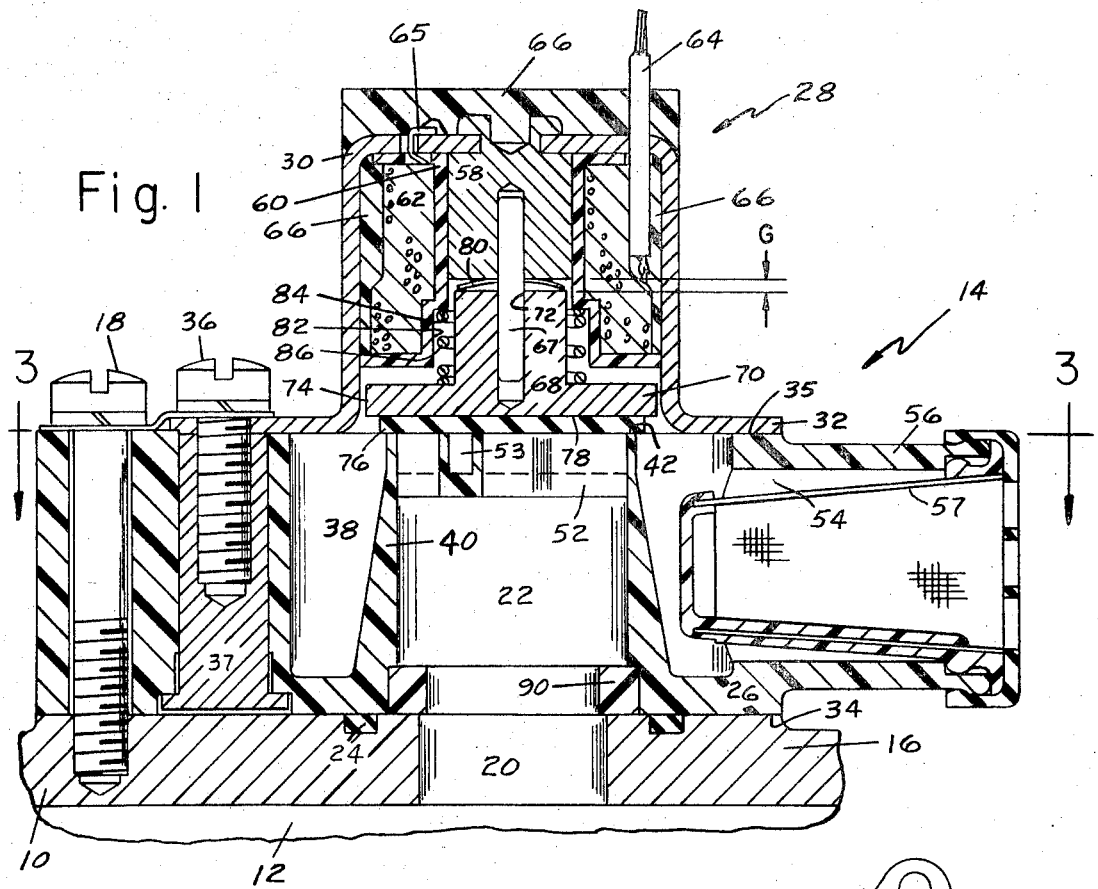
Fig. 1
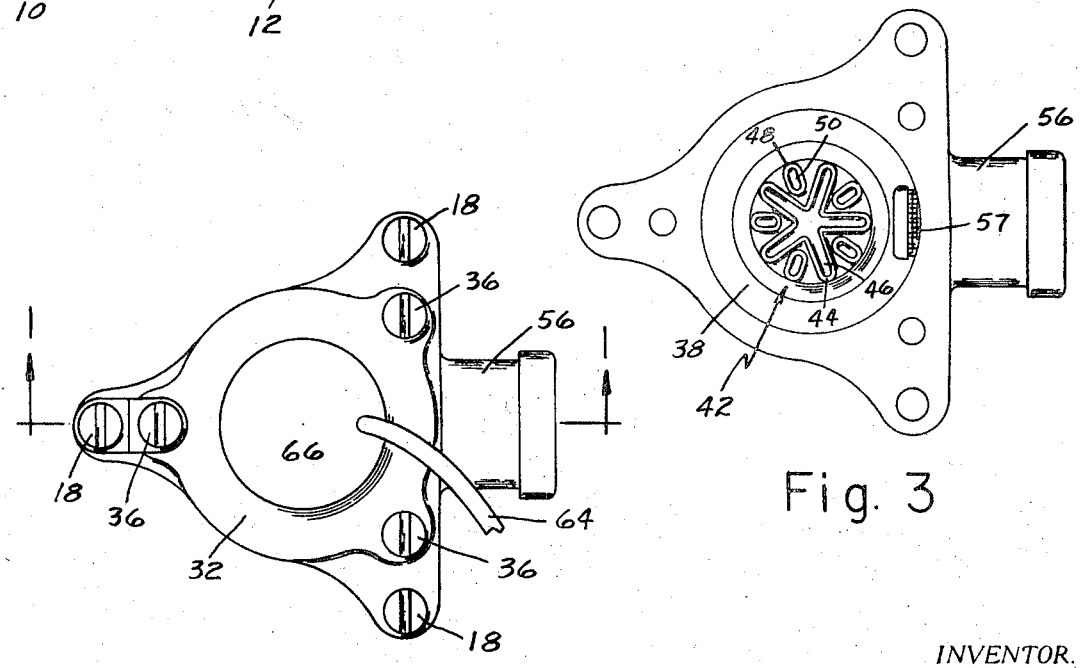
Fig. 2
Fig. 3
INVENTOR.
RICHARD L. SILVESTRINI
BY
Plante, Hartz, Smith & Thompson
ATTORNEYS INVENTOR.
RICHARD L. SILVESTRINI
BY
Plante, Hartz, Smith & Thompson
ATTORNEYS Patented April 24, 1973

INVENTOR.
RICHARD L. SILVESTRINI
BY
Plante, Hartz, Smith & Thompson
ATTORNEYS

Patented April 24, 1973

INVENTOR.
RICHARD L. SILVESTRINI
BY
Plante, Hartz, Smith & Thompson
ATTORNEYS

SOLENOID VALVE WITH STROKE INSENSITIVE PORT

BACKGROUND OF THE INVENTION

The invention relates to solenoid valves and is particularly applicable to solenoid valves of the type described in U. S. application No. 62,239 filed Aug. 5, 1970, now abandoned, in the names of Irving R. Ritsema and James K. Roberts, having a common assignee with this application, for use in adaptive braking systems for automotive vehicles such as are described in U. S. Pat. No. 3,494,671. The valves in such systems should be susceptible to mass production, and mass assembly of parts manufactured. Therefore, tolerances should be large enough to permit very low cost mass manufacturing. However, the function of the systems demands that the valves have a high degree of uniformity in performance, particularly in regard to the amount of air flow. This uniformity of performance has been achieved in the past by providing valves with adjustments for lift or stroke, and adjusting each valve under operating conditions until its mass air flow falls within predetermined limits. Such methods are both expensive and time consuming.

SUMMARY OF THE INVENTION

Therefore, it is an object of this invention to provide a solenoid valve which will produce uniform mass air flow from valve to valve in spite of dimensional variations requisite to low cost mass manufacturing.

It should be noted further that conventional solenoid valves for use with air pressure or vacuum operated systems have round valve seats or ports. Since it is rarely possible to provide enough lift in these valves to give an entrance orifice equal to the seat area, it should be obvious that the force required to lift the valve from such a seat is greater than necessary to provide the desired flow. In adaptive braking systems for automotive vehicles, such as are referred to above, the air gap (which is the stroke) must be minimized to provide the rapid action needed to modulate the brake pressure applied to the wheel cylinder. Since the energy required to open the valve is inversely proportional to the square of the air gap, minimum operation, energy and time can only exist at a minimum air gap requirement. The solenoid valves are energized by the vehicle electrical system which is of rather low voltage. The current for the valves is usually controlled by transistors whose capacity is usually limited for reasons of practical economy. Therefore, it is very undesirable for the solenoid valves to require excessive forces to lift the valve plungers from their seats.

Consequently, it is a further object of the invention to provide a solenoid valve in which the flow area and seat area are substantially equal, whereby the lifting forces required by the valve are minimized for a given mass air flow capacity.

It is proposed to obtain these objects by providing a valve in which the valve seat port configuration comprises an arrangement of elongated slots in which the ratio of slot width to the maximum and minimum valve lift is controlled in a predetermined manner. Various arrangements of slots are possible and several are illustrated and described.

Systems for different vehicles and valves for different functions in a given system may require different mass air flows. Since one of the major costs of mass production is the cost of tooling for the various parts, a further object of the invention is to provide a simple means of altering one basic valve having an air flow capacity equal to the maximum requirement, so that it can meet the lesser requirements. It is proposed to accomplish this object by the addition of an orifice in series with the valve seat port. Such an orifice serves not only to limit the mass air flow of a given valve, but also to further reduce mass air flow variation due to variation in valve lift. It should be fairly obvious that the tooling cost for a basic valve and two orifices would be materially less than the tooling cost of two solenoid valves.

BRIEF DESCRIPTION OF THE DRAWINGS

FIG. 1 is an enlarged longitudinal sectional view along the line 1-1 of FIG. 2 of a solenoid valve including a fragmentary view of a brake pressure modulator upon which the valve is mounted.

FIG. 2 is a top plan view of the solenoid valve.

FIG. 3 is a half-scale sectional view along the line 3—3 of FIG. 1 showing details of the valve seat construction.

DETAILED DESCRIPTION OF THE INVENTION

Figure 4:
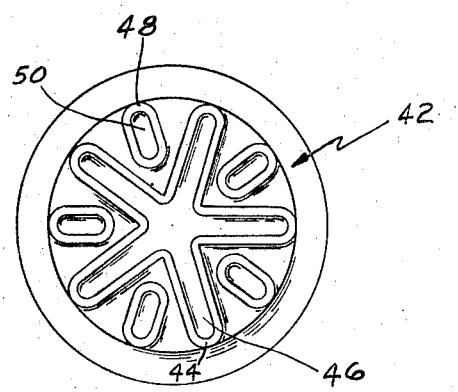
FIG. 4 is an enlarged plan view of the valve seat of the valve of FIGS. 1 to 3 inclusive.

Referring to FIG. 1 of the drawings, there is shown a casting 10 which may be the housing of a vacuum or air powered brake pressure modulator for use in an adaptive braking system on an automotive vehicle. The housing 10 may enclose a chamber 12 containing a diaphragm or piston (not shown), the movement of which is to be controlled by a solenoid valve. The solenoid valve, designated generally by the numeral 14, is mounted on a boss 16 of the housing 10 by means of three capscrews 18. The boss 16 is formed with an air inlet passage 20 communicating with an air outlet passage 22 of the valve 14 and the joint between the two passages is sealed by an O-ring 24.

The valve 14 comprises a body 26, which preferably is fabricated as a plastic molding, and a coil assembly designated generally by the numeral 28. The coil assembly 28 is contained in a coil housing 30 formed as a hat-shaped steel stamping having a mounting flange 32. The body 26 is formed with parallel flat surfaces 34 and 35. The lower of these surfaces, 34, rests on the boss 16 and is formed with the air outlet passage 22 which extends upward through the body 26 toward the upper surface 35. The upper surface 35 receives the mounting flange 32 on the coil housing 30 and three capscrews 36 extend through mounting holes in the flange 32 and are threaded into metallic inserts 37 molded into the plastic valve body 26. The upper surface 35 of the body 26 also is formed with a generally cylindrical air chamber 38 which extends downward into the body molding 26 in annular relationship to the outlet passage 22. A cylindrical wall 40, which is formed between the chamber 38 and the outlet passage 22, extends toward the upper surface 35 and at its upper end is configured to form a valve seat 42.

Referring particularly to FIGS. 3 and 4, it will be seen that the valve seat 42 is made up of a plurality of continuous thin walls surrounding elongated openings or slots of various shapes. One of these walls, designated 44, surrounds a generally star-shaped opening 46 disposed in a valve centered location. Five other walls 48 surround openings 50 of narrow oval-shape disposed between the arms of the star-shaped opening 46. All of these valve seat walls 44 and 48 are finished flush with the upper surface 35 to form the valve seat 42.

Referring back to FIG. 1, the walls 44 and 48 are positioned on a generally flat horizontal wall 52 which forms an upper termination of the outlet passage 22. The openings 46 and 50 extend through this wall 52. The surfaces of the walls 44 and 48, which are external to the openings 46 and 50, respectively, combine with the wall 52 to form deep grooves 53 communicating with the air chamber 38. An air inlet passage 54 extends radially through a side wall of the body 26 and through a boss 56 formed on the side of the body 26. In the case of air operation, the boss 56 is connected to a source of air pressure (not shown). In the case of vacuum operation, the boss 56 contains an air filter 57.

A cylindrical pole piece 58 is attached by riveting to the top of the coil housing 30. A molded plastic coil bobbin 60, upon which a coil 62 is wound, is annularly disposed about the pole piece 58. An electrical lead 64, connected to the coil 62, is provided for connection to a control system (not shown). The other terminal 65 of the coil may be grounded. The coil assembly 28 which is made up of the coil housing 30, the coil bobbin 60, the coil 62, the electrical lead 64 and the grounded terminal 65 is impregnated with a suitable plastic potting compound 66 which serves to hold the parts in assembly. A guide pin 67 of non-magnetic metal is secured in the pole piece 58. A cylindrical plunger 68, having a flange 70 and a central opening 72, is slidably mounted on the guide pin 67 so that it is constrained only to move axially. The flange 70 is slightly smaller in diameter than the inside of the coil housing 30 and forms a radial air gap 74 therewith.

A disc 76 of resilient elastomeric material is secured to the flat bottom surface 78 of the flange 70 to form a movable valve element to cooperate with the fixed seat element 42. The adjacent ends of the pole piece 58 and the plunger 68 are flat and parallel and, when the movable valve element 76 is on the valve seat 42, a predetermined air gap G exists between the said ends. A spring tempered deformed washer 80, of non-magnetic sheet material is placed in the air gap G to serve as a combined anti-residual magnetism shim and a supplementary return spring. The coil bobbin 60 has an enlarged central bore 82 at its lower end terminating in a shoulder 84. A plunger return spring 86 is disposed in the cavity formed by the bore enlargement 82. The ends of the spring bear against the shoulder 84 and the upper surface of the flange 70.

As a feature of the invention, the lower surface 34 of the valve body 26 is formed with an annular recess surrounding the air outlet passage 22. An orifice ring 90, which may also be of molded plastic, is pressed or cemented into this recess. The ring 90 is formed with a central orifice which may be made of a particular diameter for purposes which will be explained later.

The operation of the solenoid valve is conventional and will not be described in detail, it being understood that, when the coil 62 is energized by applying a voltage to the terminals 64 and 65, the valve plunger 68 is attracted to the pole piece 58, and the movable valve element 76 is raised from the seat 42 a distance equal to the air gap G less the thickness of the deformed spring washer 80. Air is permitted to flow from the inlet passage 54 to the outlet passage 22 and thence to the diaphragm chamber 12 through its inlet passage 20. The air entering the diaphragm chamber 12 performs the desired work such as moving the diaphragm and altering the brake line pressure. The rate at which the air enters the chamber 12 is frequently critical to the successful operation of the adaptive braking system.

It will be observed that, if normal manufacturing tolerances are applied to the several parts of the valve, the air gap G will not be the same in successive valves, but will vary through a range of values determined by the total of the dimensional tolerances allowed on the several parts. Especially for strokes less than one-fourth the diameter of the valve, the effective orifice area of conventional valves is equal to the perimeter of the valve seat times the lift or stroke. Therefore, the orifice area varies directly as the lift and the mass air flow will also vary directly as the lift. Consequently, it has been thought necessary to control the lift of the valve to the desired range of plus or minus 6 to 8 percent from a mean value. This has been found to be too costly by direct control of dimensional tolerances of the individual valve parts, and, as stated previously, adjustments were incorporated in the valve designs. These adjustments permitted setting the air flow to predetermined limits by actual test. The present invention permits the use of practical manufacturing tolerances and eliminates the use of adjustments.

Figure 5:
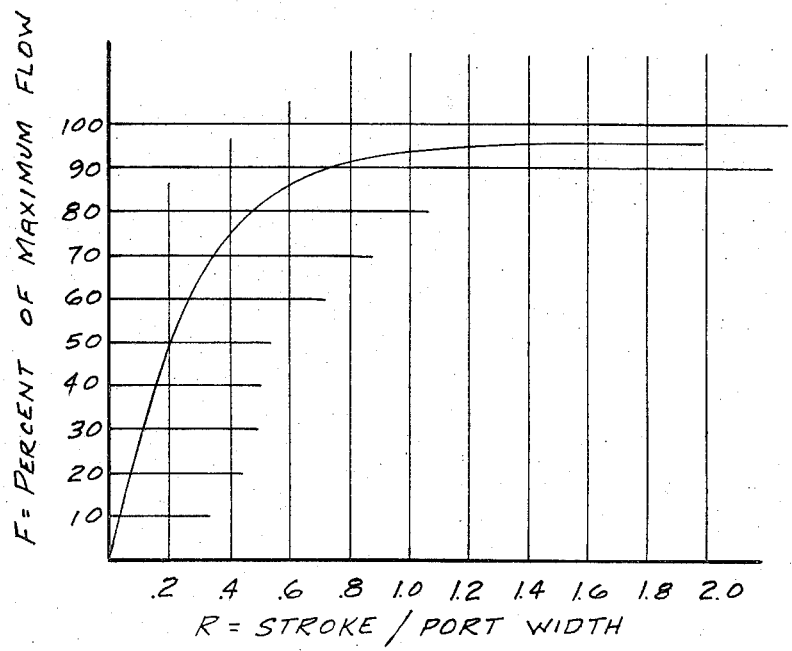
FIG. 5 is a plot of a generalized curve of percent of mass air flow through a long narrow port versus the ratio of the port width to the valve plunger lift or stroke.

There are eight factors involved in the design of stroke insensitive valve seats. The first four factors, which are width, minimum stroke, maximum stroke and percent variation of flow with stroke, determine the stroke sensitivity of the seat. The next two, which are cross-sectional area and air flow, determine the capacity of the seat. The last two, which are shape and clearance area, determine the actual design. Clearance area is defined as that area through which the air must flow in order to enter the orifice areas. The curve of FIG. 5 defines the basic relationship between seat width, stroke and flow. Usually the designer will make a trial selection of the seat width and minimum and maximum stroke. The curve is then used to determine the percents of flow corresponding to the selected minimum and maximum strokes. It should be noted that 100 percent flow is the flow at infinite stroke. The percent variation is then determined as in the following example. If it is not satisfactory, the designer may make a new trial selection.

Figure 6:
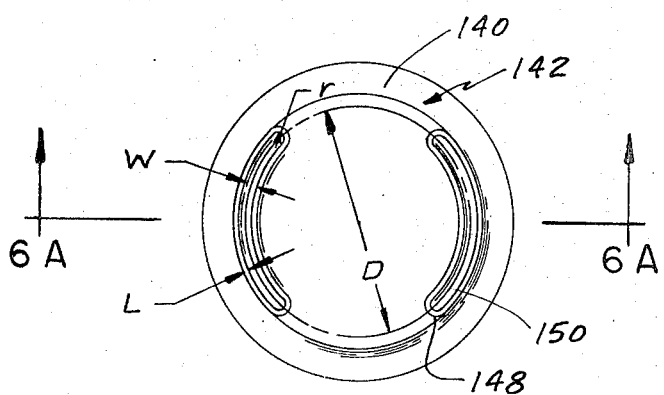
FIG. 6 is an enlarged plan view of a valve seat of simple form for the purpose of illustrating the calculations involved in carrying out the invention.
Figure 6A:
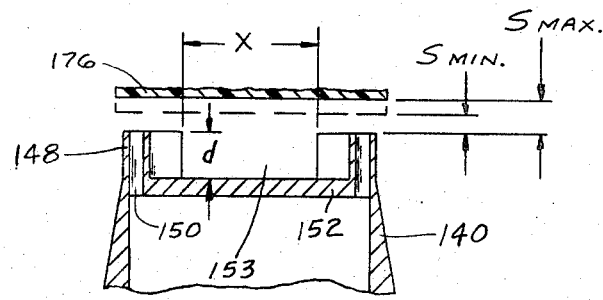
FIG. 6A is a sectional view along the line 6A—6A of FIG. 6.

Referring now to FIGS. 6 and 6A, which illustrate a simplified port configuration, the parts are designated by the same numerals as those used in FIGS. 1 to 4 inclusive plus 100. Assume that, in designing a seat of this configuration, the designer selects the following three values:

port width = $W$ = 0.040 inch,
minimum stroke = $S_{min.}$ = 0.020 inch and
maximum stroke = $S_{max.}$ = 0.030.

Then $R_{min.} = S_{min.} / W = 0.50$, and
$R_{max.} = S_{max.} / W = 0.75$.

From the curve of FIG. 4 percent flow at $R_{min.}$ = 83%,
percent flow at $R_{max.}$ = 90%, and
% variation = % flow at $R_{max.}$ − % flow at $R_{min.}$/% flow at $R_{min.}$
= (90−83)/83 = 8.4%

Thus, it will be seen that the flow variation is reduced from about 50 percent in a conventional valve to 8.4 percent in a valve designed in accordance with the invention.

The next step is to compute the required area $A$ of the valve seat to provide the flow required by the application for which the valve is being designed. Let us assume that the required flow is 75 lbs./hr. The design point may be selected as the average percent flow or the minimum percent flow. Using the minimum insures that the required flow will always be present in any given valve. The average percent flow will be used in this numerical example. It has been determined that maximum flow through long narrow ports of this character is very nearly 1,000 lbs./hr./sq.in. Therefore average % flow = ½ (90 + 83) = 86.5%,
100% flow = required flow/average percent flow/100,
= 75 / 0.865 = 86.8 lbs./hr., and
required area = $A$ = 86.8 / 1000 = 0.868 sq. in.

If the port is to be of the shape shown in FIG. 6, consisting of two 90° arcs having a width $W$ equal to 0.040 inches and a radius arc $r$ equal to 0.020 inches, the area $A$ may be expressed as follows:

$A = 2\pi (0.020)^2 + (\pi/2) D (0.040)^2$ where $D$ is the mean diameter of the port arcs. Substituting $A$ = 0.868 sq. in.

and solving for $D$, $D$ = 1.38 inches.

The final step is to determine the dimension d shown in FIG. 6A as the depth of the clearance area whose width is indicated by $X$. If the width of the lands $L$ surrounding the port openings is assumed to be 0.020 inches, $X$ may be determined as follows:

$X = (D/2 \sin 45°) − 2 (0.020 + 0.020)$
= 0.895 inches.

Since one-fourth of the total area $A$ is fed across $X$, the depth $d$ must be a minimum value determined as follows:

$d$ = 0.0868 / (4 × 0.895)
= 0.0243 inches.

The data and methods used in this example are considered valid for ports having a length to width ratio of at least 8:1 and a maximum width of 0.078 inches. The variations in the procedures required to make similar calculations for seats of more complex form such as are shown in FIGS. 7 to 11 inclusive should be readily apparent to those skilled in the art.

Figure 7:
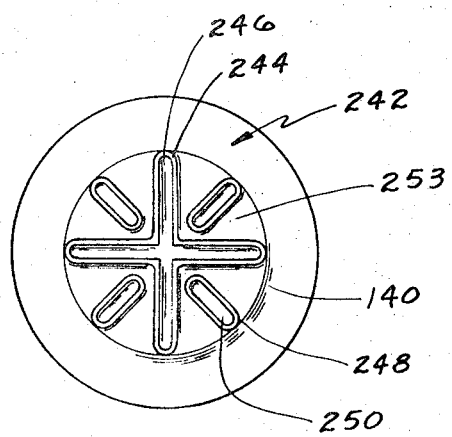
FIGS. 7 to 11 inclusive are enlarged plan views of valve seats of alternate configurations.

It will be observed by studying the details of the solenoid valve 14 that the valve seat 42 is limited to a generally circular area somewhat smaller in diameter than the flange 70 of the plunger 68. It is an important feature of the invention to maximize the effective port area which can be incorporated in the available space while utilizing the principles of design for stroke insensitivity just described. By this means, a much greater flow capacity is obtained and it can be shown that this is accomplished without increasing the forces required to open the valve. The seat 42 of FIGS. 1 to 4 inclusive illustrates one approach to this objective. This configuration presents some difficulty in manufacture; however, because the close spacing of the arms of the central star-shaped opening 46 and the radially disposed oval openings 50 requires that the grooves 53 be quite deep to provide the required clearance area. FIG. 7, in which like parts are designated by the same numerals plus 200, illustrates a seat configuration which requires less depth in the grooves 253 because of the wider separation of the arms of the cross-shaped central opening 246, and the radially disposed oval openings 250. This configuration is somewhat easier to manufacture but does not provide quite so much increase in air flow.

Figure 8:
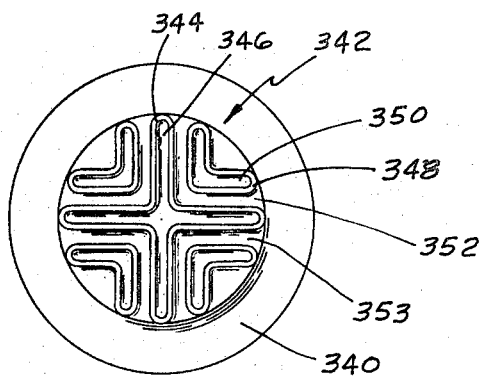
Figure 9:
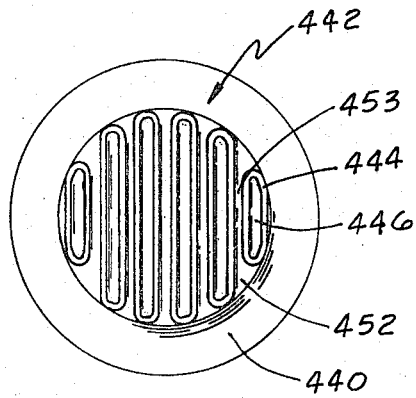
Figure 10:
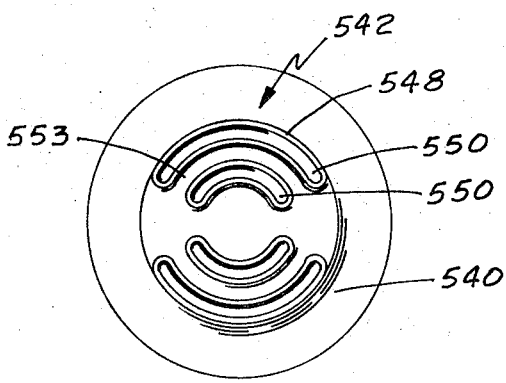
Figure 11:
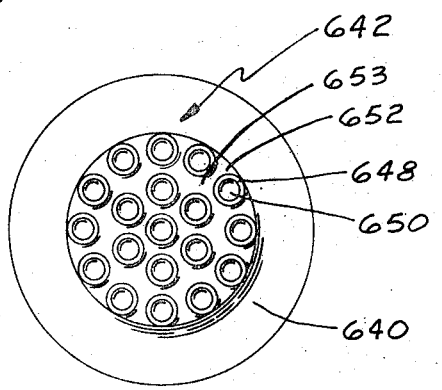

FIG. 8, in which like parts are designated by the same numerals plus 300, illustrates another form of seat in which V-shaped port openings 350 are interposed between the arms of a cross-shaped opening 346. This configuration again forces deepening of the grooves 353 to provide adequate clearance area. FIG. 9, in which like parts are designated by the same numerals plus 400, illustrates another approach in which straight slot-like openings 446 are disposed chordally within a circumscribing circle. FIG. 10, in which like parts are designated by the same numerals plus 500, is an improvement over the simplified port arrangement of FIGS. 6 and 6A in that two pairs of arcuate port openings 550 are arranged concentrically to form this seat. These openings 550 occupy arcs of 120° rather than 90°, again requiring that the grooves 553 be made deeper to provide the needed clearance. FIG. 11, in which like parts are designated by the same numerals plus 600, illustrates a rather basic variation, comprising a multiplicity of small circular ports 650. A relationship similar to that shown in FIG. 5 can be shown to exist between flow through small circular orifices and the ratio of valve stroke to orifice diameter. The establishment of suitable clearance areas in a valve seat such as 642 is not difficult.

As mentioned heretofore, the valve 14 may be designed with a maximum mass air flow capacity in excess of the air flow requirement of a given system in which case the valve 14 would not be suitable unless modified to compensate for the lesser flow requirement. To that end, the mass air flow through valve 14 for a given application may be reduced as desired by simply installing an orifice 90 of suitable effective flow area which by virtue of the series flow relationship with valve seat 42 establishes a corresponding limit on the mass air flow through passage 22.

It will be recognized that the above described control apparatus is equally operative regardless of the direction of air flow through passage 22 and thus may be arranged with boss 56 connected to a source of air at a pressure higher or lower than atmospheric air pressure.

I claim:

1. A solenoid valve comprising:

a coil;

a plunger operated by said coil;

a movable valve element attached to said plunger, said movable valve element having a stroke which may vary between predetermined limits; and a valve body formed with a valve seat cooperating with said movable valve element characterized by said valve seat comprising walls surrounding a central star-shaped opening and elongated oval openings positioned between the arms of said star-shaped opening;

said star-shaped opening and oval openings having a width related to the stroke of said movable valve element within certain ratios such that mass air flow through the open valve varies less than permitted variation in stroke.

2. The solenoid valve of claim 1 and further including:

a restriction in series flow relationship with said valve seat and operative to limit flow therethrough to a predetermined maximum value.

3. The solenoid valve of claim 2 wherein said restriction is located downstream from said valve seat.

4. A solenoid valve comprising:

a coil;

a plunger operated by said coil;

a movable valve element attached to said plunger, said movable valve element having a stroke which may vary between predetermined limits; and a valve body formed with a valve seat cooperating with said movable valve element characterized by said valve seat comprising walls surrounding a control cross-shaped opening and elongated openings positioned between the arms of said cross-shaped opening;

said cross-shaped opening and elongated openings having a width related to the stroke of said movable valve element within certain ratios such that mass air flow through the open valve varies less than permitted variation in stroke.

5. The solenoid valve of claim 4 and further including:

a restriction in series flow relationship with said valve seat and operative to limit flow therethrough to a predetermined maximum value.

6. The solenoid valve of claim 7 wherein said restriction is located downstream from said valve seat.

* * * * *